Feb. 16, 1943.  L. J. NOWAK, JR  2,310,988
MATERIAL HANDLING AND WEIGHING MACHINE
Filed Dec. 8, 1937  6 Sheets-Sheet 1
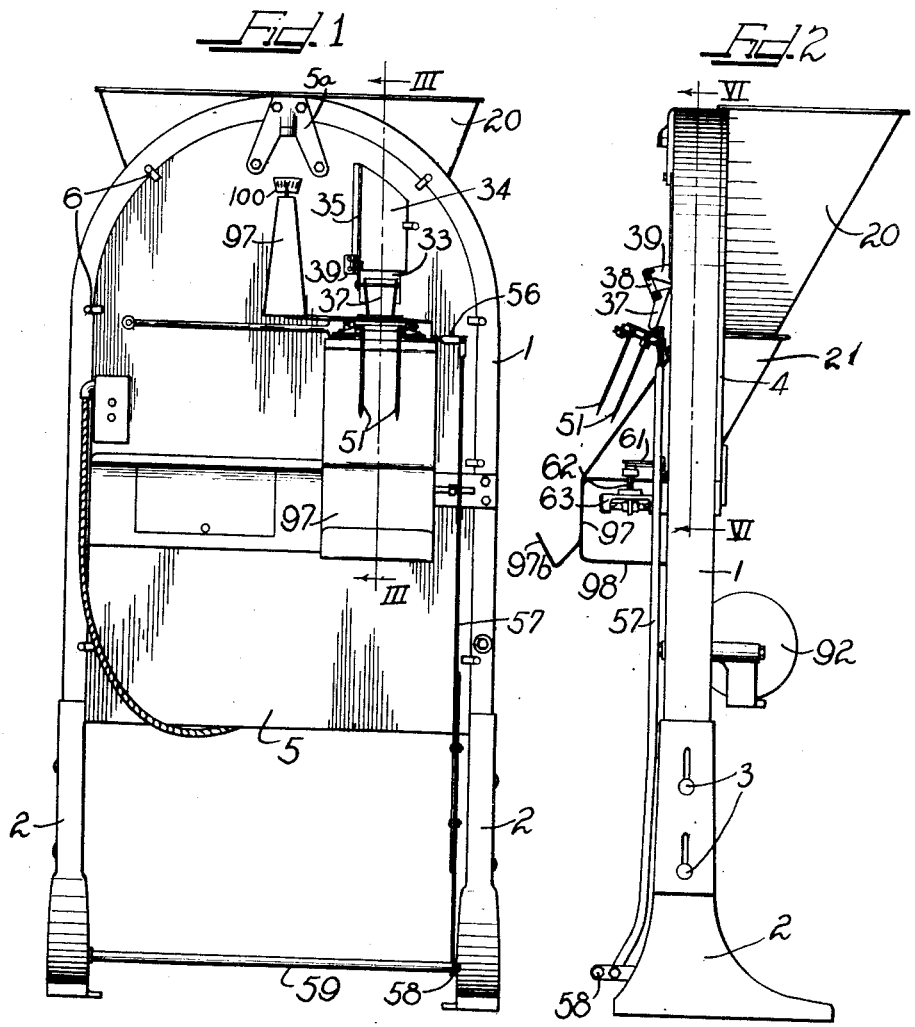
Inventor
LEON J. NOWAK, JR.

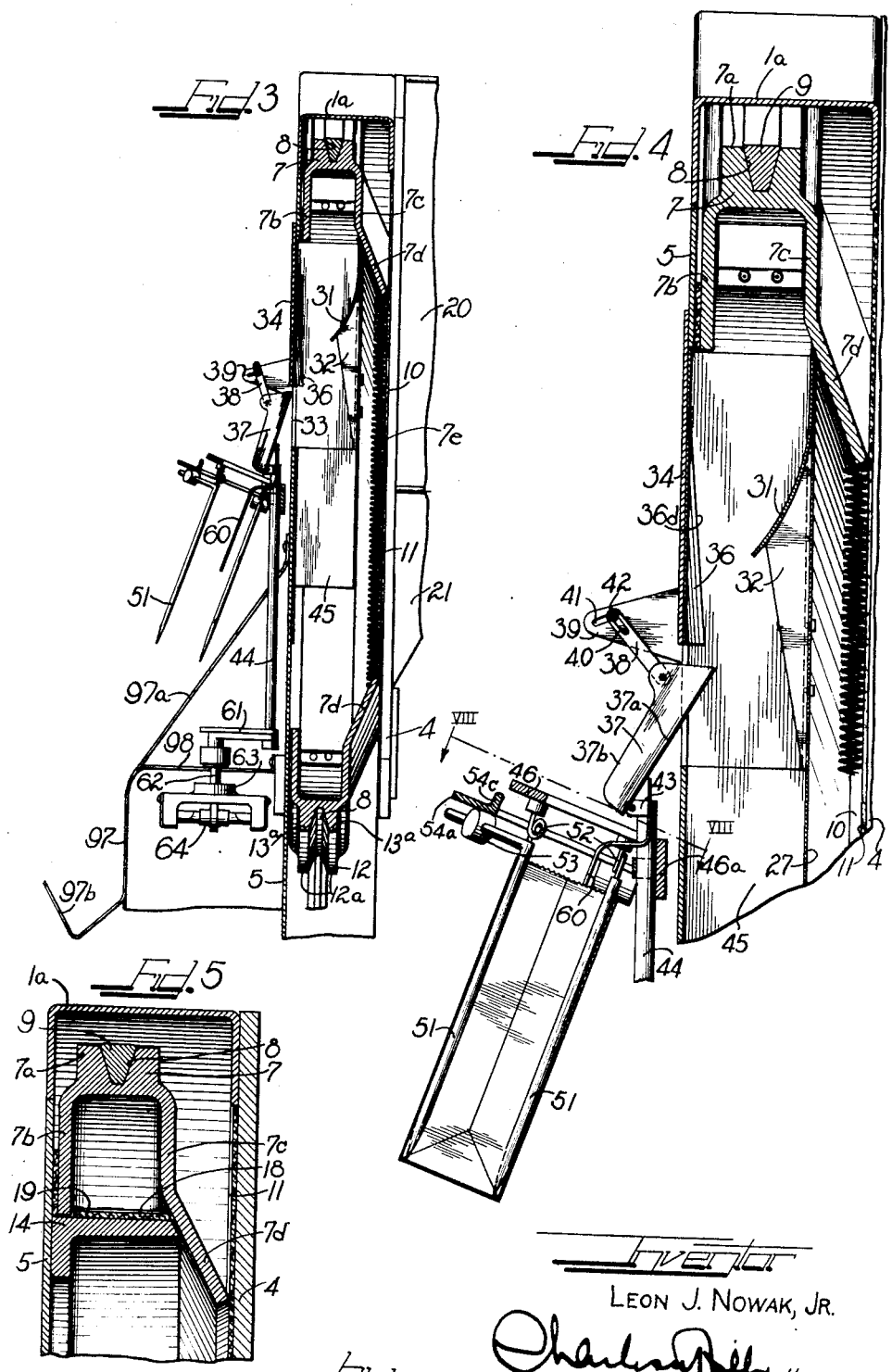

Feb. 16, 1943.  L. J. NOWAK, JR  2,310,988
MATERIAL HANDLING AND WEIGHING MACHINE
Filed Dec. 8, 1937  6 Sheets-Sheet 3
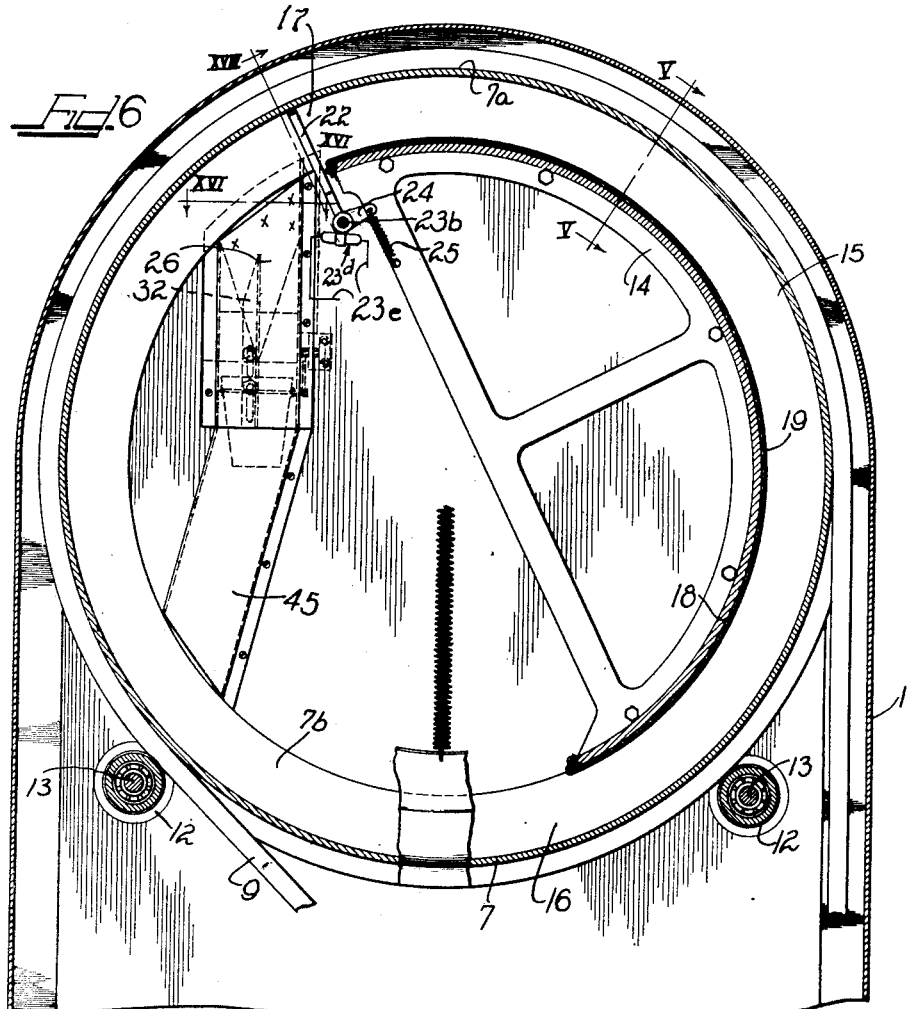
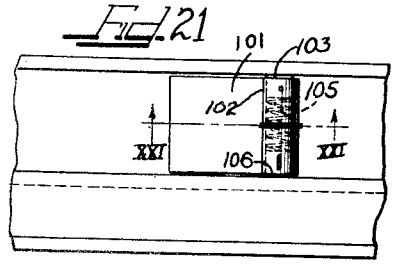
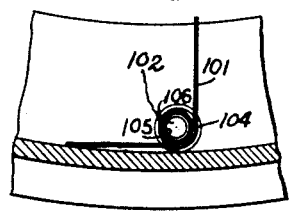
Inventor
LEON J. NOWAK, JR.

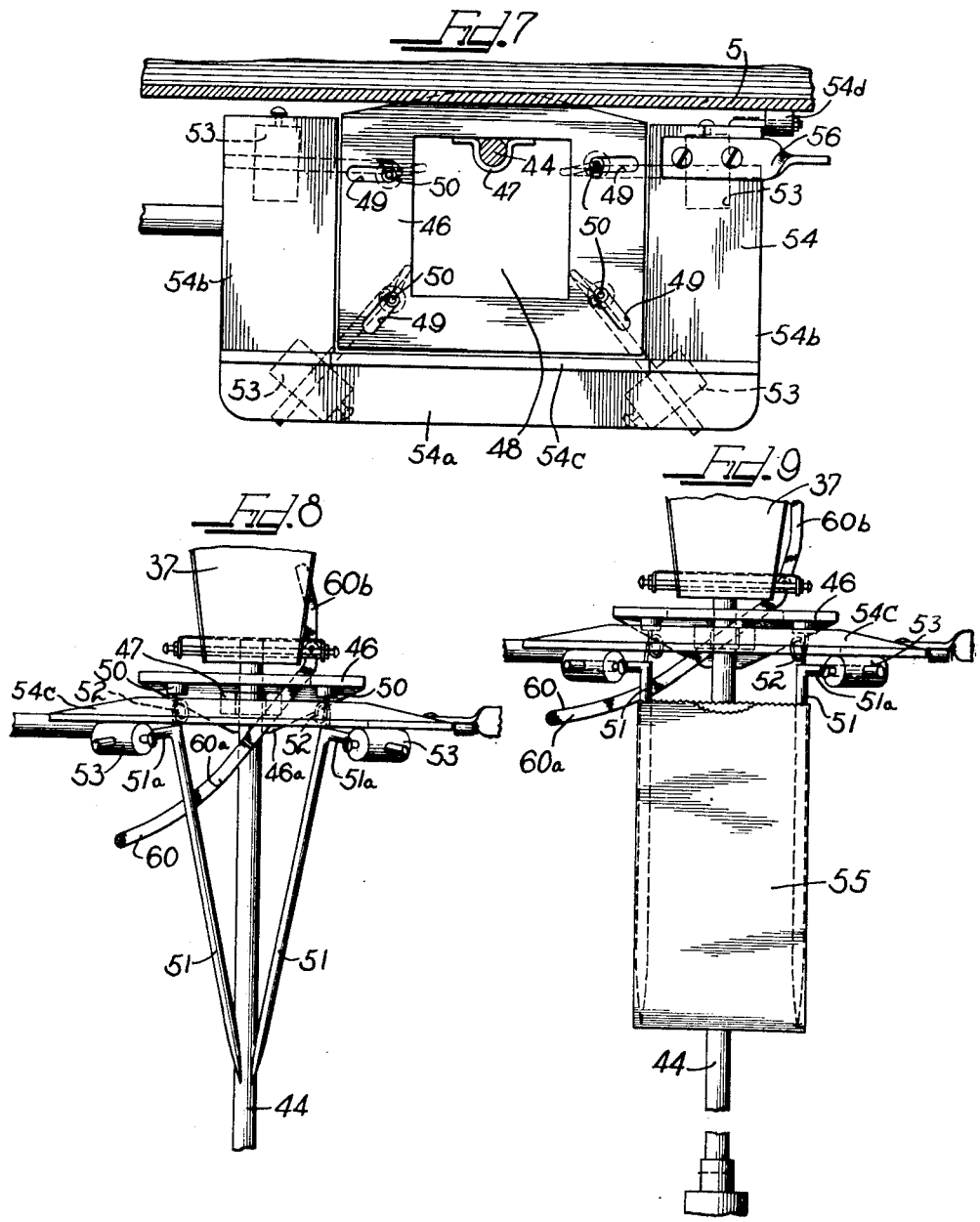

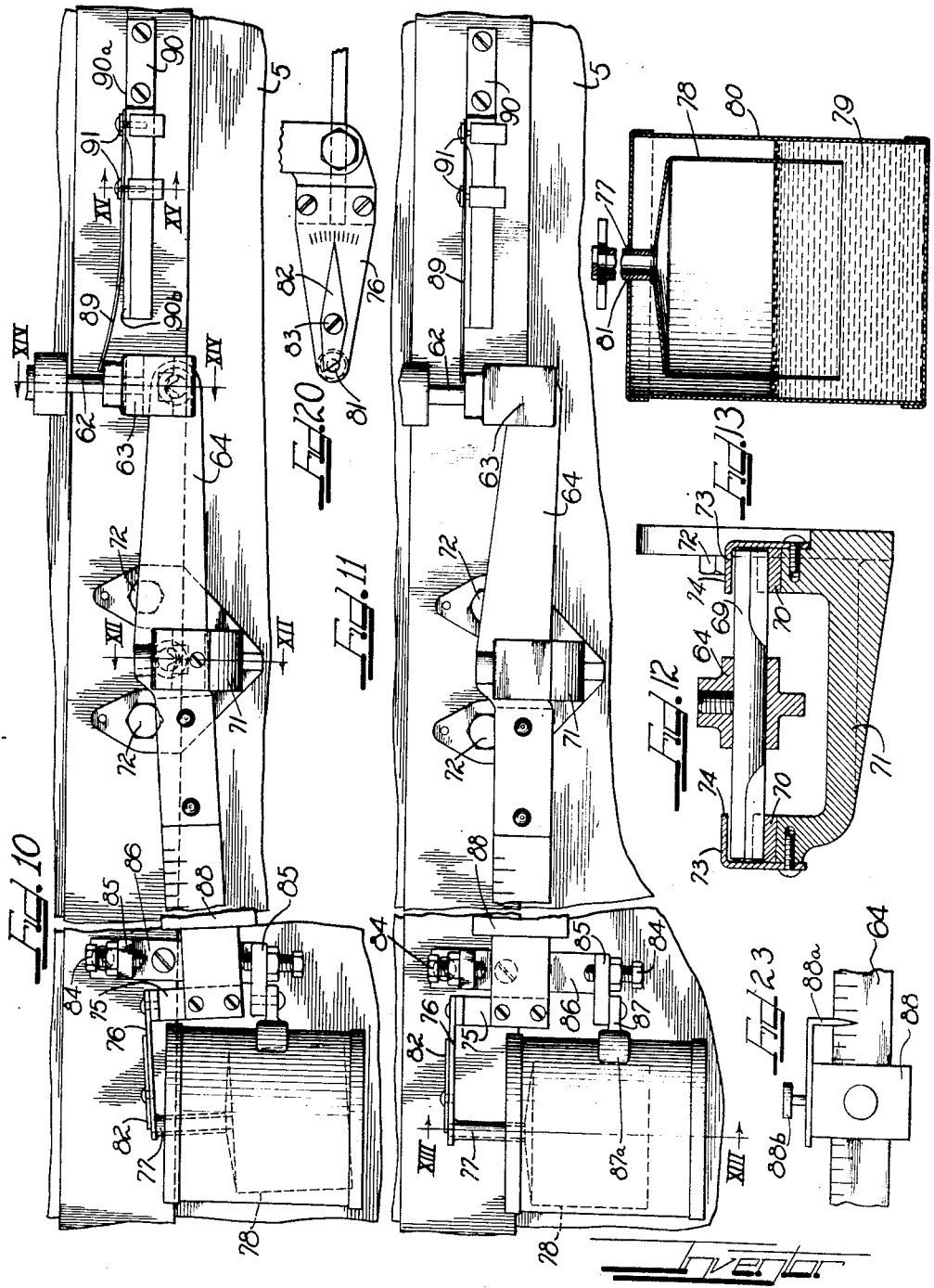

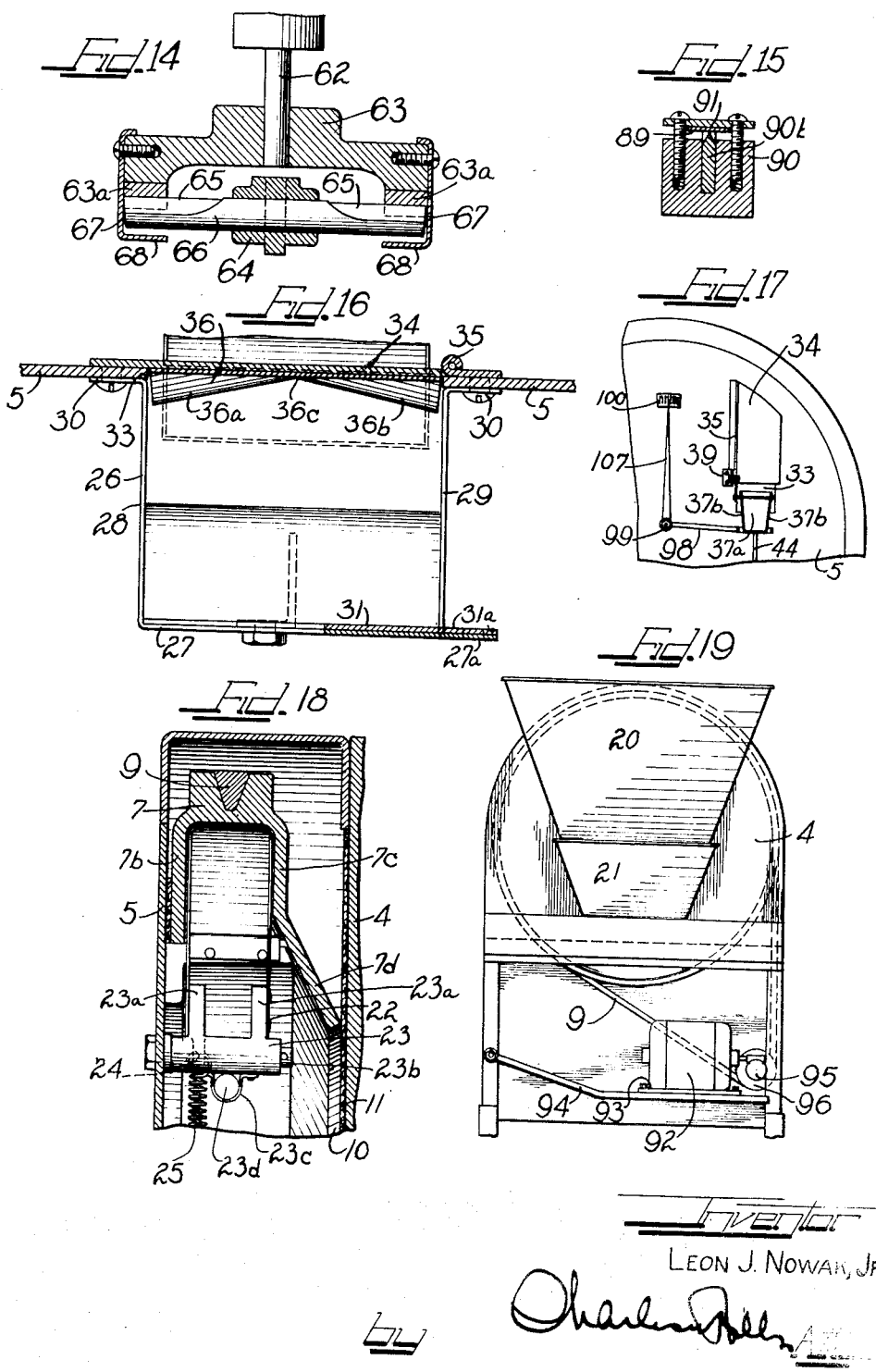

Patented Feb. 16, 1943

2,310,988

UNITED STATES PATENT OFFICE 2,310,988

MATERIAL HANDLING AND WEIGHING MACHINE

Leon J. Nowak, Jr., Chicago, Ill.

Application December 8, 1937, Serial No. 178,688

12 Claims. (Cl. 249—58)

This invention relates to a material handling and weighing machine in which the bag or container constitutes a part of the weight transmitted to a scale.

It is an object of this invention to provide a machine of this type which is very accurate in its operation and which is designed for handling very fine material at a rapid rate as well as coarse material.

It is a further object of this invention to provide mechanism in connection with such a machine for opening paper bags when they are placed in position to be filled and simultaneously controlling the feeding of material into them.

It is a further object of this invention to provide a novel form of conveyor that will rapidly feed fine material in an even steady stream that is desirable and conducive to obtaining accurate weight.

It is a further object of this invention to control the material feeding means to the bag so that a proper dribble is provided for completing the desired weight in a very accurate manner.

With these and other objects in view which will become more apparent as the description proceeds, this invention comprises the novel structure and combination of parts hereinafter described and more particularly pointed out and defined in the appended claims.

In the accompanying drawings which illustrate a preferred form of this invention and in which similar reference numerals refer to similar features in the different views, Fig. 1 is a front elevational view of a weighing machine involving this invention.

Fig. 2 is a side elevational view of said machine.

Fig. 3 is a fragmentary sectional view of the machine taken upon the line III—III of Fig. 1 looking in the direction of the arrows.

Fig. 4 is an enlarged view of Fig. 3 with parts omitted.

Fig. 5 is an enlarged sectional view taken upon the line V—V of Fig. 6 looking in the direction of the arrows.

Fig. 6 is an enlarged sectional view taken upon the line VI—VI of Fig. 2 looking in the direction of the arrows.

Fig. 7 is an enlarged part sectional and part plan view taken substantially upon the line VII—VII of Fig. 4 looking in the direction of the arrows.

Fig. 8 is an enlarged elevational view of the bag opening mechanism in position to receive a bag.

Fig. 9 is a view similar to Fig. 8 illustrating the manner of opening a bag.

Fig. 10 is an enlarged fragmentary elevational view illustrating the scale beam and the damping means therefor, with the parts in one position.

Fig. 11 is a view similar to Fig. 10 showing the parts in a different position.

Fig. 12 is an enlarged sectional view taken upon the line XII—XII of Fig. 10 looking in the direction of the arrow.

Fig. 13 is an enlarged sectional view taken upon the line XIII—XIII of Fig. 11 looking in the direction of the arrows.

Fig. 14 is an enlarged sectional view taken upon the line XIV—XIV of Fig. 10 looking in the direction of the arrows.

Fig. 15 is an enlarged sectional view taken upon the line XV—XV of Fig. 10 looking in the direction of the arrows.

Fig. 16 is an enlarged sectional view taken substantially upon the line XVI—XVI of Fig. 6 looking in the direction of the arrows.

Fig. 17 is an enlarged fragmentary front elevational view of the machine.

Fig. 18 is an enlarged sectional view taken substantially upon the line XVIII—XVIII of Fig. 6.

Fig. 19 is a rear elevational view of the machine.

Fig. 20 is an enlarged plan view of the rear end of the scale beam.

Fig. 21 is an elevational view of a cleanout device for the conveyor ring.

Fig. 22 is an end elevational view of the same.

Fig. 23 is a fragmentary elevational view of the scale beam and counterpoise.

In the drawings there is shown an embodiment of this invention which should be understood as merely illustrative of the invention. This chosen embodiment of the invention comprises a U-shaped channel frame member 1 the lower ends of which are adjustably secured in sockets of supporting shoes 2 by means of bolts 3 (Fig. 2). It is therefore possible to raise or lower the machine with respect to the supporting shoes as desired. A plate 4 is attached to the rear part of the frame member. The upper part of this plate 4 is arcuate to correspond with the curvature of the U-shaped frame member, while the lower edge which is straight terminates at about midway of the height of the machine. A frontal plate 5 having an upper arcuate portion fits within the front side of the frame member 1 and is secured at the top to a bracket 5a on the channel frame 1 and is further secured by means of lugs 6. The plate 5 extends downwardly to a point spaced slightly beyond the top of the shoes 2 as shown in Fig. 1.

It will be noted that the web 1a of the U-shaped channel member 1 is relatively narrow and that this channel member forms with the front and rear plates a narrow chamber having an upper arcuate wall adapted for housing a rotatable conveyer 7 best shown in Figs. 4, 5 and 6. This conveyer 7 is in the form of a circular wheel or ring having a rim 7a with a suitable groove 8 for receiving an operating belt 9. The front side of the rim terminates in an inwardly directed annular flange 7b that extends in substantial parallel relation with the frontal plate 5. The rear side of the rim 7a terminates in an annular inwardly directed flange 7c that extends in parallel relation with the flange 7b for a portion of its width and then slopes rearwardly at an angle as indicated at 7d for guiding the material that is fed into the machine so that as it descends into the machine it will fall into the groove formed by the rim 7a and flanges 7b and 7c of the rotary conveyer wheel. A sheet of felt 11 or other suitable sealing material is preferably attached to the inner face of the plate 4 and fits within the frame 1.

The conveyer 7 is supported for rotary movement upon a pair of spaced rollers 12 suitably journalled upon shafts 13 which may be supported on the front and rear plates or in any suitable manner. The rollers 12 are grooved as shown in Fig. 3. The rollers 12 have annular bearing surfaces 12a at the sides of the grooves (Fig. 3) that engage the circular bearing surfaces 13a on the sides of the groove 8 on the conveyer. This construction allows the belt 9 to run beneath the left hand roller 12 as viewed in Fig. 6.

Within the rotary conveyer 7, there is a substantially semi-circular member or segment 14 bolted or secured to the front plate 5 as shown in Fig. 6. This segment 14 cooperates with the conveyer 7 for forming a passage 15 open at its lower end 16 for the entrance of material and open at its upper end 17 for the exit of material. The arcuate surface of the segment 14 is preferably covered with felt or some suitable sealing material 18 over which a steel or metal plate 19 is fastened.

The material such as granulated coffee, flour, or other fine substances is fed into the conveyer ring 7 thru a hopper 20 supported against the back plate 4 and discharging into a chute 21 (Figs. 3 and 19) attached to the back plate 4. From an inspection of Fig. 3, it will be seen that the material is discharged into the lower portion of the conveyer ring 7 over the sloping portion 7d of the rear flange 7c. A wire 7e is preferably stretched across the rear opening in the conveyer ring and secured thereto for rotation therewith for agitating the material entering the ring thru the hopper.

At the discharge end 17 of the passage 15, there is a scraper 22 (Figs. 6 and 18) that extends into the groove of the conveyer ring as shown in Fig. 18. The scraper 22 is in the form of a U-shaped spring having its ends secured to arms 23a on a rotatable sleeve bearing 23 which is journalled upon a stub shaft 23b supported by the front plate 5. This sleeve bearing is provided with an arm 24 in the casing and a spring 25 connects the arm 24 to the casing. The tendency of the spring 25 is to yieldingly sustain the scraper against the force of the stream of material in the conveyer ring; this scraper will act to break or interrupt the stream of material and tend to cause the same to descend into a chute 26.

Secured to the sleeve bearing 23 by a clamp 23c is a mercoid switch 23d that may be connected by the lead wires 23e (Fig. 6) in series with the motor circuit, with the result that should the scraper be caused to move a predetermined extent due to choking of the material and the like, the motor would be cut out.

The chute 26 is formed by a sheet metal member as shown in Fig. 16. This sheet metal member is bent to provide an inner wall 27 and side walls 28 and 29 which terminate in attaching flanges 30 bolted or secured to the front plate 5. Above the side wall 29, there is a lateral projection 27a on the inner wall 27, that extends slightly beyond the said side wall 29. A plate 31 is positioned against the inner wall 27 within the chute 26 and this plate has a lateral lug 31a extending over the top of the side wall 29 in registry with the projection 27a. This plate 31 is welded to the wall 27 at its upper portion as indicated in Fig. 16. Thus the lateral projections 27a and 31a which extend into the advancing material carried by the conveyer will aid in diverting the material into the chute.

The plate 31 is quite flexible and below the welded part it is flexed into a convex form by means of a wedge 32 as clearly shown in Figs. 3 and 4. Thus the material descending in the chute will strike the deflecting plate 31 which will deflect the stream of material toward a suitable discharge opening 33 in the front wall 5. The upper portion of the opening 33 is closed by a door 34 which is hinged to the front plate 5 as indicated at 35 so that the material only emerges from the lower portion of the opening.

Upon the inner side of the door there is a construction that tends to converge the stream of material as it approaches the discharge opening 33. This construction preferably comprises a plate 36 having surfaces 36a and 36b (Fig. 16) which slope or converge toward each other to substantially the center line 36c. This plate 36 also slopes inwardly from the front wall as indicated at 36d in Fig. 4. The plates 31 and 36 merely serve to guide and conform the stream of material into a suitable stream into which a deflector 37 is adapted to move for intercepting a part of the stream of material for conveying the same to a bag or container. The converging portion of the stream further provides an apex upon its outer side. As the deflector moves out of the stream, it passes out of the apex during its final movements so as to produce a proper dribble.

The deflector 37 is in the form of a small chute with a bottom 37a and side walls 37b which slightly converge toward the discharge end as shown in Fig. 17. The upper end of the chute is pivotally connected by a link 38 to a bracket 39 secured to the front plate 5, just below the hinge 35 which is cut away a short distance upwardly to receive the bracket. It will be noted that the link 38 is provided with a slot 40 and the bracket 39 is provided with a slot 41, and that the pivot 42 that connects the link with the bracket passes thru the slots 40 and 41 providing a lost motion connection. The lower end of the deflector 37 is pivoted to a lug 43 on a scale rod 44 which is adapted to be raised for moving the upper end of the deflector into the stream of material and which is adapted to be lowered to move the deflector out of the stream.

The material which is not deflected by the chute 37 passes down the chute 26 and thru an extension 45 (Fig. 6) on the chute and back into the conveyor ring. The extension 45 on the chute 26 may be formed from sheet metal in any suitable manner.

Mechanism has been provided for opening and supporting a bag for receiving material from the deflector 37. Ordinarily the deflector 37 is out of the stream of material but is moved into the stream when the bag is placed in position. In referring to Figs. 4, 7, 8 and 9 it will be noted that the scale rod 44 carries a plate 46; the plate 46 having a downwardly extending flange 46a connected by a metal strap 47 to the scale rod 44. This plate 46 is provided with a central opening 48 thru which the material passes to a bag.

The plate 46 is provided with four slots 49 in which studs or bolts 50 are adjustable. A bag opening finger 51 is yieldably connected to each stud 50. While the yielding connections may assume various forms, the preferable connections consist of coil springs 52 which have their ends respectively connected to the bolts and fingers. It will be noted that the upper ends of the fingers 51 terminate in laterally directed arms 51a to which the lower ends of the springs 52 are secured. Each arm 51a adjustably supports a cylindrical fulcrum member 53.

A finger actuating member 54 is associated with the fulcrum members 53. This member 54 comprises a front portion 54a which extends along the front edge of the plate 46 and side portions 54b which extend along the sides of the plate 46. The front portion 54a of plate 54 has an upstanding flange 54c that extends lengthwise adjacent the plate 46. With reference to Fig. 7 it will be noted that the finger actuator 54 rests upon the fulcrum members 53. When the actuating member 54 is depressed as shown in Fig. 8 the fingers are swung to bring their lower ends together in converging relation so that a paper bag 55 can be manually telescoped thereover. Then when the actuator is released, the springs 52 will automatically swing the fingers into vertical positions for opening the bag as shown in Fig. 9 in which position the fingers support the bag while it is being filled. When the fingers 51 are moving to vertical positions or are being spread to open the bag, the actuator 54 will be moved upwardly by the fulcrum members 53 as shown in Fig. 9. A roller 54d is attached to the rear edge of a side portion 54b for rolling against the plate 5 for guiding the actuator. While the finger actuator may be depressed in various ways, in the present instance it is shown as provided with an arm 56 connected to a link 57 (Figs. 1 and 2) which in turn is pivotally connected to a treadle 58 of any suitable construction, and which may be secured to a shaft 59 extending between the shoes 2.

It is desirable to maintain the deflector 37 out of the stream of material until a bag is properly positioned upon the fingers to receive its contents. To this end there is provided suitable means for normally maintaining the deflector out of the stream of material until the bag has been properly positioned and opened to receive material from the deflector. This means may assume various forms and may be made responsive to various movable parts. In the present instance, this means is made responsive to the application of the bag upon the fingers 51. As clearly shown in Figures 4, 8, and 9, a trip lever 60 is pivoted intermediate its ends to the lug 43 on the rod 44. This trip lever has an arm 60a that extends in the path of the bag as it is applied to the fingers and an arm 60b that extends above the pivot thereof at an angle to the arm 60a for the purpose of engaging the deflector upon the rear part thereof when the parts are in the positions shown in Fig. 8. When a bag is placed upon the fingers and moved upwardly, it will engage the arm 60a of the lever 60 and swing the same upwardly and cause the lever arm 60b to move out from behind the deflector 37 as shown in Fig. 9 allowing the deflector to move into the stream of material.

The aforementioned rod 44 is rigidly connected to an arm 61 (Fig. 3) on a stud 62 rising from a coupling 63 having a pivoted connection with the scale beam 64. In referring now to Figs. 10 to 14, it will be noted that the connection 63 has spaced bearings 63a that engage knife edge bearings 65 upon a pivot rod 66 extending thru and connected to the scale beam 64. The connection 63 is provided with end plates 67 with flanges 68 extending under the rod 66 to prevent displacement of the connection with respect to the pivot rod 66.

At an intermediate point, the scale beam has secured thereto a second knife edged rod 69 that engages bearings 70 on a bracket 71 attached to the front plate 5 by bolts 72 as shown more clearly in Fig. 10. To prevent displacement of the rod 69, end caps 73 may be attached to the bracket 71 as shown in Fig. 12. These end caps include flanges 74 that extend over the ends of the rod 69 to prevent material upward displacement of the rod. The rear end of the scale beam has a bracket 75 attached thereto. This bracket supports an arm 76, from which extends in a downward direction, a hollow stem 77 having an inverted cup-shaped member 78 at its lower end that dips into a fluid 79 in a container 80 forming thereby a dash pot. The fluid 79 may be any light oil but I preferably use "Prestone," a product which I have discovered does not wet the surface of the cup to any appreciable extent.

In referring to Figs. 13 and 20 it will be noted that the hollow stem 77 provides an air passage 81 that extends thru the arm 76 and thru which the flow of air may be regulated by an adjustable valve 82 or closure member. This closure member 82 is pivoted to the arm intermediate its ends as indicated at 83 and one part of the arm 82 cooperates with the passage 81 for regulating the inward or outward flow of air.

The use of this dash pot with the scale beam is especially important in dampening the movement thereof and preventing undue up and down oscillations that retard the speed of operation. It has been discovered that the rate of filling packages upon the machine is greatly increased by the use of this dash pot.

It will be noted that air is adapted to be confined in the cup shaped member 78 above the liquid and that this air can escape thru the passage 81 when the cup shaped member is lowered and additional air can enter thru the passage 81 when the cup shaped member is elevated. Thus a retarding action is produced.

The oscillation of the rear part of the scale beam 64 may be limited by screws 84 (Figs. 10 and 11) which are threaded through lugs 85 on a bracket 86 attached to the front plate 5. Incidentally the dash pot is supported by the lower lug 85 by means of a casting 87 or the like which is secured to the lug 85 and provided with an arcuate portion 87a welded to the dash pot. The desired weight of a package is determined by the usual slidable weight 88 on the scale beam.

The weight or counterpoise 88 is provided with an adjustable pointer 88a (Fig. 23) extending forwardly thereof. This pointer 88a is held in adjustable position by a screw 88b. This pointer can be adjusted so that the distance between its point and the counterpoise 88 will correspond to the weight of the bag or receptacle and the pointer will indicate the weight of material in the bag or receptacle.

In the case of this apparatus, it will be understood that the material deflector 37 is responsive to the movements of the scale beam. When the scale beam is in its unbalanced position as shown in Fig. 10, the deflector 37 will be in the stream of material to its maximum extent, and when the scale beam is in its balanced position, the deflector 37 will be entirely out of the stream of material. When the deflector is cut out of the stream, there is a certain amount of material in the air that descends into the bag and, sometimes causes overweight. It is highly desirable in order to secure an accurate weight to have the final feeding of material into the bag in the form of a dribble. In order to insure a proper dribble of material during the final feeding of material, yielding means for coaction with the scale beam for a predetermined distance in its downward movement to balanced position has been provided.

This yielding means is best illustrated in Figs. 10, 11 and 15 and consists of a flat leaf spring 89 which is mounted upon a bearing bracket 90 secured to the plate 5 forwardly of the scale beam. The leaf spring 89 is adjustably secured to the top of the bearing bracket 90 which has a flat portion 90a and a longitudinally extending knife edge 90b mounted therein. The rear end of the leaf spring rests upon the flat portion 90a of the bracket while forwardly thereof it rests upon the knife edge. Bridging pieces 91 extend over the leaf spring, one at the flat portion and one at the knife edge. These bridging pieces are bolted to the bearing bracket 90 for holding the leaf spring firmly in position. In using, a knife edge bearing, it is impossible for any material to accumulate under the leaf spring and interfere with its effectiveness.

The leaf spring extends beyond the knife edged bearing and engages the top of the connection 63 for exercising a slight downward pressure upon the scale beam for a predetermined distance. When the scale beam is in substantially unbalanced position as shown in Fig. 10, the leaf spring 89 is flexed upwardly and exerts a slight downward pressure upon the scale beam. When the scale beam descends to a point where the leaf spring is straight as shown in Fig. 11, said spring exerts no pressure upon the scale beam. This leaf spring is rather light and is merely designed to exert about two ounces of pressure against the scale beam. Such two ounces correspond substantially to the material in air produced for small packages. Of course, as the scale beam starts its downward movement, the pressure exerted by the leaf spring will gradually decrease until it ceases to exert any pressure at all.

It will be appreciated that this additional pressure exerted by the spring 89 will accelerate the downward movement of the scale beam and cause the deflector 37 to begin its movement out of the stream of material sooner than otherwise would occur with the result that there will be a good dribble established from the deflector 37 during the final period of feeding material into a bag before it moves entirely out of the stream. This dribble is desirable in producing an accurate weight.

For guiding the bag from its position on the fingers a suitable apron 97 (Fig. 3) may be secured upon the front plate 5. This apron is provided with a sloping portion 97a down which the bag may slide and a hooked shaped rest 97b at its lower end for supporting the filled bag when it is released from the fingers. The lower part of this apron is supported against a casing 98 that houses the scale proper.

The conveyor ring heretobefore described is operated from a motor (Fig. 19) 92 supported upon a platform 93 carried by a bracket 94 pivoted to a leg of the machine. The motor is geared to a shaft 95 that rigidly carries a pulley 96 over which the belt 9 is trained. The pivot mounting of the bracket 94 causes the same to act as a belt tightener. Any suitable stop means may be used to sustain the bracket in the event that the belt breaks.

In referring to Fig. 17, it will be noted that a pointer 107 having an arm 98 at right angles thereto is pivoted at the apex 99 of said arms to the front plate 5. The arm 98 extends to and is connected to the bracket 43 on the rod 44 that supports the deflector. The vertical movements of the deflector will tilt the pointer, and when the scale beam descends to balanced position, the pointer will indicate the weight. To this end, the upper end of the pointer is designed to move over a calibrated plate 100. With this construction, a single attendant can "check weigh" each weighing, making unnecessary his stopping at frequent intervals to "check weigh" on a stationary scale.

When it is desired to fill bags with different material than there happens to be in the conveyor, it is desirable to clean out the conveyor ring. To this end there has been provided a material lifting vane that can be inserted in the conveyor ring for cleaning out the material and removing the same after the ring is clean. This clean out vane may assume various forms and as a matter of illustration a suitable form has been illustrated in Figs. 21 and 22. In referring to these figures, it will be noted that a right angled leaf spring 101 with a barrel 102 in the angle thereof has been provided. The barrel 102 may be secured to the spring plate in any suitable manner. A shaft 103 extends into the barrel 102 and one end of the barrel has a bore 104 extending therein. Within this bore, there is seated a coil spring 105 against which a plunger 106 is positioned. By compressing the plunger against the spring 105, it is possible to insert this clean out device within the groove of the conveyor. After it is inserted, the spring 105 will expand and frictionally engage the outer ends of the shaft 103 and the plunger 106 with the side walls of the conveyor groove.

As the conveyor ring now rotates, the material will be elevated for discharging thru the door 34, as the clean out spring plate encounters the scraper 22 during its rotation, it will fold upon itself in passing.

In using this apparatus, the motor is started for rotating the conveyor ring 7 and elevating the comminuted material fed therein thru the hopper.

The conveyor will cause a steady stream of material to descend thru the chute 26 and 45, and back to the conveyor ring. When a bag is being filled, the deflector 37 moves into the stream to intercept material for filling the bag and then moves out of the stream when the desired weight of material has been obtained.

To fill a bag with the desired weight of material, the scale weight will be properly set, then the operator will depress the treadle 58 for lowering the finger actuating plate 54 for bringing the fingers 51 into converging relation. An empty bag, envelope or the like is now telescoped over the fingers 51 and the treadle released allowing the springs 52 to swing the fingers into vertical positions for spreading the converging ends of the fingers to distend the walls of the bag into open position as shown in Fig. 9. This movement of the fingers will naturally elevate the actuating plate 54 as shown.

As the bag is telescoped over the fingers in an upward direction, it will strike the trip lever 60 and swing the same from behind the deflector and allow such deflector to move into the path of the material for interrupting sufficient material to fill the bag to the desired weight. Thus the trip lever 60 prevents any feeding of material until the bag is in position. It might be mentioned that fingers 51 support the bag while it is being filled.

While scale beam is in its elevated position as shown in Fig. 10, the cup in the dash pot will be in its lowered position as shown in dotted lines in said figure. In this position, the spring 89 exerts about two ounces of pressure upon the forward end of the scale beam. As a bag is being filled, this additional pressure will aid in lowering the forward end of the scale beam a little sooner to a predetermined point and cause the deflector 37 to move toward the outer portion of the stream of material as before related. At the same time, the cup in the dash pot will rise, and as it rises, air will enter the passage 81 and find its way into the cup. Thus there is provided an air cushion together with a dampening effect upon the scale beam that prevents undue and objectionable up and down oscillations and consequently increases the speed of operation.

It will be appreciated from the foregoing description that a very efficient and accurate weighing machine has been provided that has a greatly increased rate of speed over prior machines, that is designed to handle very fine material as well as coarser material. It should especially be appreciated that the auxiliary means that acts upon the scale beam for a predetermined extent of movement of the latter is very effective in causing an outward movement of the deflector to provide a proper dribble for completing the desired weight in a bag. It has been found in actual practice that this apparatus will weight within one-sixty-fourth (1/64) of an ounce of the desired weight.

I am aware that many changes may be made and numerous details of construction may be varied through a wide range without departing from the principles of this invention, and I, therefore, do not purpose limiting the patent granted hereon otherwise than necessitated by the scope of the appended claims.

I claim as my invention:

1. In a weighing machine, a conveyor for feeding material in a stream, a movable scale element, a deflector pivotally supported upon said element for movement into and out of said stream, bag opening mechanism supported by said scale element adjacent said deflector including bag expanding fingers for sustaining a bag in open position for receiving material from said deflector.

2. In a weighing machine, a conveyor for feeding material in a stream, a scale element, a deflector supported upon said element for tilting movements into and out of said stream, bag opening mechanism supported upon said element including fingers for expanding a bag and retaining the same for receiving material from said deflector and means responsive to the movement of a bag on said mechanism for controlling said deflector.

3. In a weighing machine, a conveyor for feeding material in a steady stream comprising a rotatable ring having an interior annular groove, a segment cooperating with a portion of said groove to define a passage thru which material is conveyed and means for rotating said ring.

4. In a weighing machine, a material feeding device comprising a rotatable ring having an interior unobstructed groove for receiving the material, a stationary segmental member within said ring and closing from within a portion of said groove and means for rotating said ring.

5. In a weighing machine, a conveyor for feeding material comprising a ring like member having an interior annular groove for receiving the material to be conveyed, a segment in opposed relation to a portion of said groove and forming a passage for receiving material at one end and discharging it at the other end and means for rotating said ring.

6. In a machine for weighing materials, a conveyor for feeding material in a steady stream comprising a ring like member having an annular interior groove adapted for frictionally retaining material, a segment in cooperation with said groove for forming a passage open at its ends for receiving and discharging material, means for feeding material into said groove and means for rotating said ring.

7. In a weighing machine comprising a casing having a front face, means within said casing for producing a stream of material, a deflector movable into and out of said stream for intercepting material, a scale element having means for supporting said deflector, a pointer pivoted to the front face of said casing and having an arm secured to said second named means and responsive to the movement of said scale element.

8. In a machine for weighing divided material including a scale element, the improvement comprising a conveyor for flowing said material in loose condition as a circulating stream, means coacting with said conveyor to define a closed endless path for said streaming material, said path defining means being formed with an aperture, a deflector in said path opposed to and ahead of said aperture for diverting streaming material across said path toward the apertured path side, and a second deflector movable under the actuation of said scale element through said aperture into and out of the diverted stream for diverting streaming material onto said scale element.

9. In a machine for weighing divided material including a scale element, the improvement comprising a conveyor for flowing said material in loose condition as a circulating stream, means coacting with said conveyor to define a closed endless path for said streaming material, said path defining means being formed with a transverse aperture and with converging surfaces in the apertured side ahead of said aperture, a deflector in said path opposed to and ahead of said aperture for diverting streaming material across said path against said converging surfaces whereby the diverted stream is caused to converge transversely, and a second deflector movable through said aperture under the actuation of said scale element into and out of the converging stream for directing streaming material onto said scale element.

10. In a weighing machine including a scale element, the improvement comprising a conveyor for feeding material in loose condition as a circulating stream, said conveyor including a rotatable ring having an interior annular groove, a segment cooperating with a portion of said groove to define a passage through which said stream is flowed, means for rotating said ring, wall defining means cooperating with the remainder of said groove to define a conduit forming complementarily with said passage an endless circuit for said stream, said wall being formed with an aperture opening axially of said ring and with a deflector ahead of said aperture for diverting streaming material across said conduit toward said aperture, and a second deflector movable under the actuation of said scale element into and out of the aperture for diverting diverted streaming material onto said scale element.

11. In a weighing machine including a scale element, the improvement comprising a conveyor for feeding material in loose condition as a circulating stream, said conveyor including a rotatable ring having an interior annular groove, a segment cooperating with a portion of said groove to define a passage through which said stream is flowed, means for rotating said ring, wall defining means cooperating with the remainder of said groove to define a conduit forming complementarily with said passage an endless circuit for said stream, said wall being formed with an aperture opening axially of said ring, with a deflector ahead of said aperture for diverting streaming material across said conduit toward said aperture, and with converging surfaces adapted to intercept the diverted material for converging the stream transversely, and a second deflector movable under the actuation of said scale element into and out of the aperture for diverting diverted streaming material onto said scale element.

12. In a weighing machine including a scale element, a conveyor for feeding material in a steady stream and a deflector movable under the actuation of said scale element into and out of said stream for diverting material onto said scale element to be weighed, the improvement including means for supporting bag opening fingers adjacent said deflector from said scale element and means also supported from said scale element for operating said fingers for opening said bag and sustaining the same while receiving material from said deflector.

LEON J. NOWAK, Jr.